US 6,658,099 B2

(12) United States Patent
Perkins, III

(10) Patent No.: US 6,658,099 B2
(45) Date of Patent: *Dec. 2, 2003

(54) SYSTEM AND METHOD FOR PROCESSING CALL DETAIL RECORDS

(75) Inventor: Frank Clifford Perkins, III, Longwood, FL (US)

(73) Assignee: Convergys CMG Utah, Inc., South Jordan, UT (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/961,673

(22) Filed: Sep. 24, 2001

(65) Prior Publication Data

US 2002/0009182 A1 Jan. 24, 2002

Related U.S. Application Data

(62) Division of application No. 09/425,548, filed on Oct. 22, 1999.

(51) Int. Cl.⁷ .............................................. H04M 15/00
(52) U.S. Cl. ............................ 379/112.01; 379/114.01; 379/114.03; 379/112.08; 379/115.01; 379/121.05; 379/126; 379/133; 379/134
(58) Field of Search ........................... 379/111, 112.01, 379/114.01, 114.03, 114.28, 115.01, 121.01, 121.04, 121.05, 126, 133, 134, 34, 112.02, 112.04, 112.05, 112.1, 32.01, 112.08

(56) References Cited

U.S. PATENT DOCUMENTS

| | | | |
|---|---|---|---|
| 5,287,270 A | 2/1994 | Hardy et al. ................... 705/34 |
| 5,325,290 A | 6/1994 | Cauffman et al. ............. 705/34 |
| 5,333,183 A | 7/1994 | Herbert ....................... 379/112 |
| 5,483,590 A | 1/1996 | Chiu et al. ................... 379/269 |
| 5,517,555 A | 5/1996 | Amadon et al. ............. 455/408 |
| 5,551,025 A | 8/1996 | O'Reilly et al. ............. 395/600 |
| 5,592,530 A | 1/1997 | Brockman et al. ............ 379/34 |
| 5,610,915 A | 3/1997 | Elliott et al. ................. 370/259 |
| 5,627,886 A | 5/1997 | Bowman ..................... 379/111 |
| 5,675,791 A | 10/1997 | Bhide et al. ................. 395/621 |
| 5,706,330 A | 1/1998 | Bufferd et al. .............. 379/114 |
| 5,712,908 A | 1/1998 | Brinkman et al. .......... 379/119 |
| 5,737,399 A | 4/1998 | Witzman et al. ............ 379/112 |
| 5,757,895 A | 5/1998 | Aridas et al. ................ 379/136 |
| 5,809,121 A | 9/1998 | Elliott et al. ................. 379/127 |
| 5,815,559 A | 9/1998 | Schnable ..................... 379/112 |
| 5,852,659 A | * 12/1998 | Welter, Jr. ................... 379/116 |
| 5,867,495 A | 2/1999 | Elliott et al. ................. 370/352 |
| 5,873,030 A | 2/1999 | Mechling et al. ........... 455/408 |
| 5,907,603 A | 5/1999 | Gallagher et al. .......... 379/133 |
| 5,999,604 A | 12/1999 | Walter ........................ 379/133 |
| 6,058,177 A | * 5/2000 | Newcombe et al. ... 379/210.01 |
| 6,134,304 A | 10/2000 | Norell .................... 379/100.05 |
| 6,134,307 A | 10/2000 | Brouckman et al. ........ 379/115 |
| 6,396,913 B1 | * 5/2002 | Perkins, III ............ 379/112.01 |

* cited by examiner

*Primary Examiner*—Sinh Tran
*Assistant Examiner*—Quoc D Tran
(74) *Attorney, Agent, or Firm*—Frost Brown Todd LLC

(57) ABSTRACT

A system and method for partitioning call detail records (CDRs) is disclosed. CDRs are grouped and routed based on one or more digits of the billable telephone number or the billable mobile identification number (MIN). In a preferred embodiment of the present invention, the last two digits of the billable telephone number or MIN are used. Once partitioned, the CDRs may be distributed across multiple processes for additional processing. In addition, subscriber, rate, and other information that may be necessary for usage processing is routed to processes based on the corresponding billable telephone number or MIN. Partitioning of CDRs and related data based on digits of the billable telephone number or MIN results in statistically balanced loading due to the random nature of calls and telephone number assignments

14 Claims, 2 Drawing Sheets

SYSTEM AND METHOD FOR PROCESSING CALL DETAIL RECORDS

BACKGROUND OF THE INVENTION

1. Field of the Invention

Figure 1:
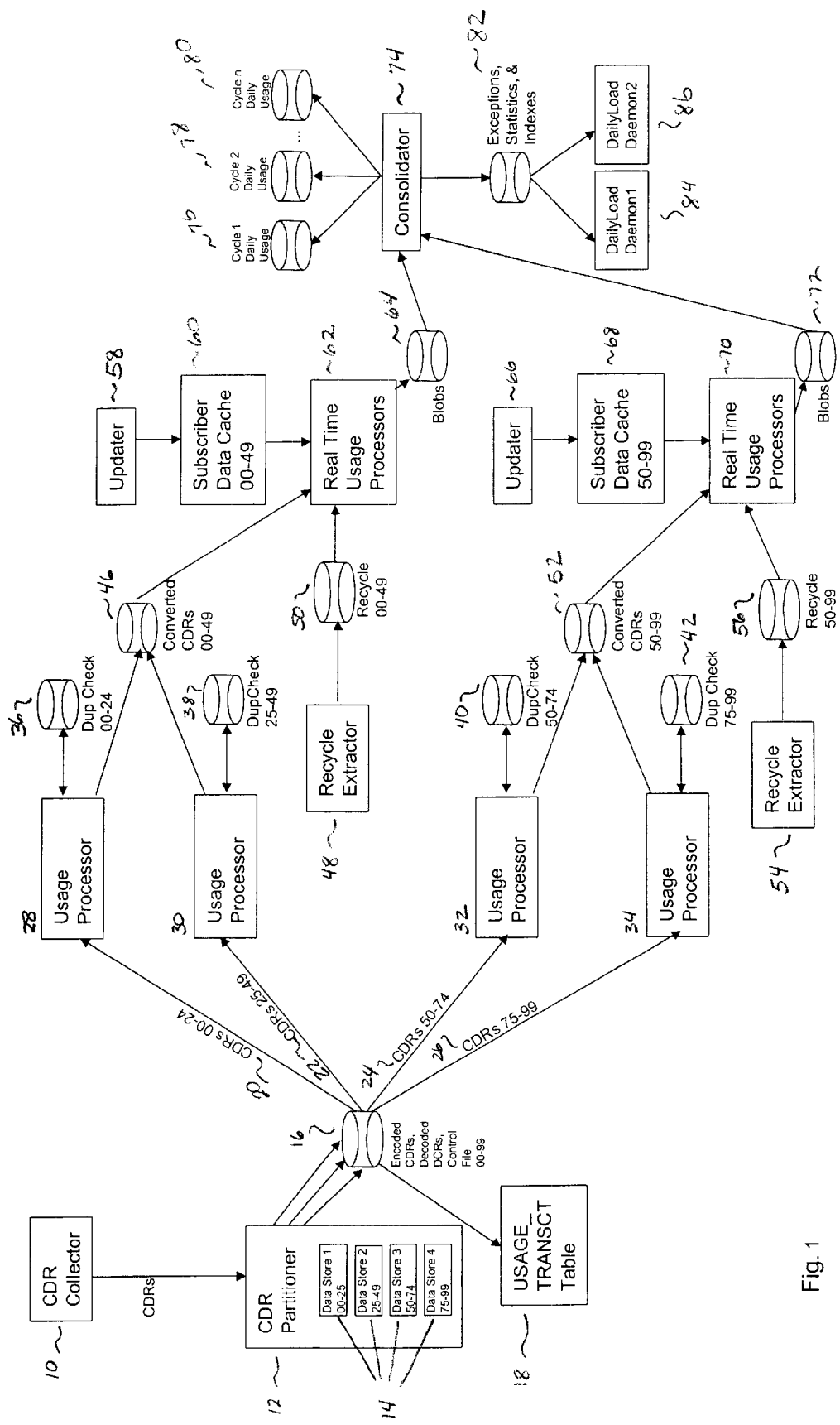

The present invention relates generally to systems and methods for processing call detail records. Particularly, the present invention relates to a system and method for partitioning call detail records and related data for usage processing.

2. Description of Related Art

Switches in telecommunications networks generate one or more call detail records for every call that they handle. The call detail record may contain detailed statistics about calls that have been made by a subscriber such as the time each call was place, the duration of each call, and the destination of each call. A call detail record may pertain to a single call or multiple calls made over a predefined time period depending on the telecommunications carrier that collects and uses the information from the call detail records. As most calls involve two or more switches, complete information regarding a single telephone call may be based on information from the call detail records of each switch that handled the call. Call detail records, therefore, must be examined to determine if and how charges for a particular telephone call should be assessed to an account, a subscriber, etc.

Call detail records are typically transmitted from switches to other computer systems for usage processing. Usage processing may comprise many activities including receiving, translating, validating, processing, and guiding of records that are used for billing purposes. Usage processing may include determining whether the call meets the telecommunications carrier's criteria for charging it to a subscriber, assigning the call to an account, and determining the rate to be charged for the call. "Guiding" is the process of associating call detail records with an account for billing. An active subscription for the account is then located based on certain selection criteria and based on a billable access number. Subscriber, rate, and other information required to complete usage processing may be stored in one or more databases that are accessed by the computer systems.

To complete usage processing, call detail records originating from many switches that handle calls must be processed. In addition, access to the subscriber, rate, and other information is required. As the volume of call detail records to be processed increases, backlogs may result at the computers as they process all the call detail records needed to bill one call and they contend for access to the databases. Therefore, there is a need for a system and method for usage processing of call detail records that is scaleable by allowing the distribution of load across many processes executing on one or more computers. As usage processing depends on the availability of subscriber, rate, and other information, there is a need for a system and method for distributing the necessary data across processes executing on one or more computers.

SUMMARY OF THE INVENTION

The present invention groups and routes call detail records (CDRs) based on one or more digits of the billable telephone number or the billable mobile identification number (MIN). In a preferred embodiment of the present invention, the last two digits of the billable telephone number or MIN are used. However, any digit or combination of digits that provides a good N-way statistical distribution may be used. In addition, other fields in a CDR may be used. Therefore, one to as many digits as there are in the telephone number field plus other fields may be used if the distribution statistics are determined to be appropriate. The approach of the present invention provides a simple, effective, and efficient way of partitioning the processing load for call detail records. In addition, subscriber, rate, and other information that may be necessary for usage processing is routed to processes and computers based on the telephone number or other field values that support partitioning of CDRs.

BRIEF DESCRIPTION OF THE DRAWING(S)

Figure 2:
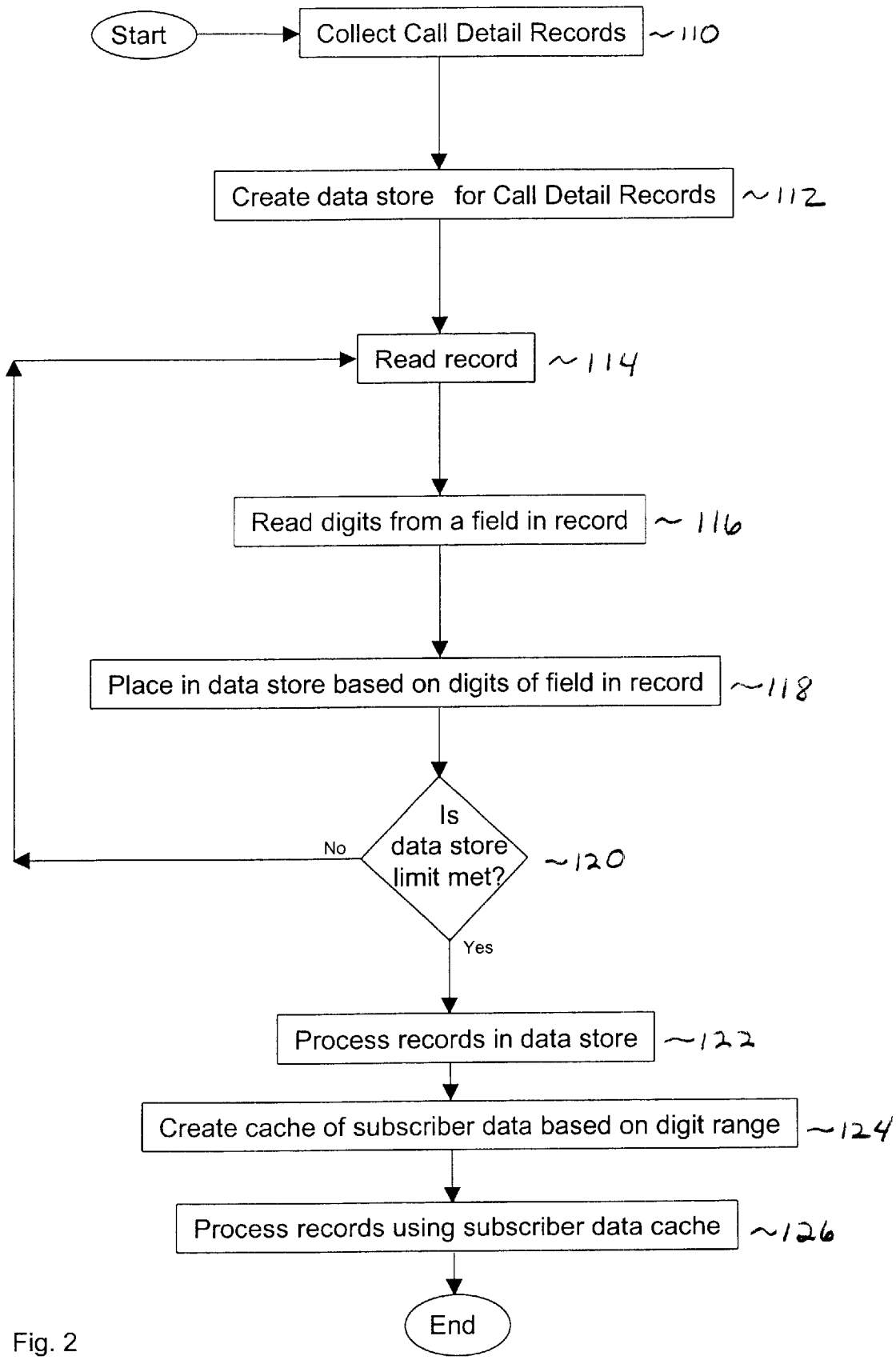

FIG. 1 is a block diagram of real-time Call Detail Record processing in accordance with a preferred embodiment of the present invention; and FIG. 2 is a flowchart of the primary steps of the present invention in accordance with a preferred embodiment of the present invention.

DETAILED DESCRIPTION OF THE PREFERRED EMBODIMENT(S)

Referring to FIG. 1, a block diagram of real-time Call Detail Record processing in accordance with the present invention is shown. FIG. 1 shows an example configuration that is based on one CDR Collector, four Usage PreProcessors, two subscriber data caches that may contain subscriber account and guiding and rating information, and one carrier database. It is understood that the present invention may operate as well in accordance with other configurations of Collectors, Usage Processors, subscriber data caches, and carrier databases.

The CDR Collector 10 collects Call Detail Records (CDRs) 12 from one or more switches operated by a carrier. The CDR Partitioner process 14 collects CDRs 12 from the CDR Collector 10 system. Preferably, a separate CDR Partitioner process is used for different types of CDRs (i.e. voice, short message, data). If the carrier has service agreements with other telecommunications carriers, it may accept and process CDRs originating from switches operated by the other carriers. Consequently, other processes for obtaining CDRs from other carriers may be used in conjunction with the CDR Partitioner process 14 to obtain all of the CDRs required to complete usage processing. It is noted that the present invention may be applied to CDRs that are received directly or indirectly from a number of different sources or carriers, etc.

As the CDR Partitioner process 14 reads a CDR 12, it may be reformatted and is placed into a data store 14, preferably, an internal holding queue, based on digits of the billable telephone number (the calling telephone number for outbound calls, the called telephone number for inbound calls). As shown in FIG. 1, each Data Store 14 is adapted to hold CDRs within a given range of digits. One Data Store 14 (Date Store 1) may hold CDRs with ending digits in the range 00–24 while three other Data Stores 14 hold CDRs with ending digits in the ranges 25–49 (Data Store 2), 50–74 (Data Store 3), 75–99 (Data Store 4). Although four data stores are shown, in an embodiment of the present invention in which two ending digits are used for processing CDRs, up to 100 data stores may be used for partitioning of CDRs. For example, each internal holding queue may hold CDRs with billable telephone numbers ending a particular combination of digits, (i.e., 01, 02, . 99).

When an internal holding queue has reached a pre-defined limit (e.g., a defined capacity or a defined age limit), its contents are written to two files. One file contains the original encoded CDRs and the other file contains the decoded CDRs. A control file is also created. The CDR files are stored on a disk 16 for later retrieval by Usage Processors. In addition to creating and storing files when an internal holding queue has reached a pre-defined limit, a record in a USAGE_TRNSCT table 30 is updated to indicate that a new file is ready for processing. The telephone number digits contained in the file (e.g., '07') are specified on the USAGE_TRNSCT record so that downstream processes know which records apply to them.

As indicated previously, in this example configuration, four Usage Processors are used to process the CDRs that have been partitioned in accordance with the last two digits of the billable telephone number or MIN. Referring to FIG. 1, the Usage Processors 28, 30, 32, 34 reformat all CDRs collected from the carrier's network (or other sources) and screens out invalid record types and duplicate records. In a preferred embodiment of the present invention, when a Usage Processor 28, 30, 32, 34 is started, the range of telephone number digits that it will process is entered on a command line used to invoke the process. In the example configuration, four Usage Processors 28, 30, 32, 34 are started. Usage Processor 28 processes CDRs in the range 00–24 20, Usage Processor 30 processes CDRs in the range 25–49 22, Usage Processor 32 processes CDRs in the range 50–74 24, and Usage Processor 34 processes CDRs in the range 75–99 26. Preferably, Usage Processors do not process overlapping telephone number digit ranges.

Each Usage Processor 28, 30, 32, 34 polls the USAGE_TRNSCT table 30 for files on the disk 16 it can process by selecting those which are marked for processing and contain telephone number digits within its range. For example, the Usage Processor 28 selects all CDRs that have telephone number digits greater than or equal to zero and less than or equal to 24. When an eligible file is found, the Usage Processor 28 reads the file name (full path name) attribute and processes the CDR file. Similarly, Usage Processor 22 selects files that have CDRs with telephone number digits in the range 25–49, Usage Processor 24 selects files that have CDRs with telephone number digits in the range 50–74, and Usage Processor 26 selects files that have CDRs with telephone number digits in the range 75–99.

For the example configuration, the first step in processing is to convert the records from a format used by the switches to a file format appropriate for further processing (e.g., an internal file format) and to store them in a Converted Rec database 46, 52 for later access. As shown in FIG. 1, two Converted Rec databases 46, 52 are used to hold reformatted records from the four Usage Processors 28, 30, 32, 34. Each record is examined by Usage Processors 28, 30, 32, 34 to see if it meets criteria for bypass. Bypass criteria may be established by a carrier to indicate that certain CDRs should not be processed and charged to a subscriber. If it is not bypassed, then the Usage Processors 28, 30, 32, 34 determine if the record is a duplicate by comparing it to records previously collected and stored by telephone number digit in DupCheck databases 36, 38, 40, 42. As shown in FIG. 1, one DupCheck database 36, 38, 40, 42 is associated respectively with each Usage Processor 28, 30, 32, 34 for processing in accordance with the telephone number digits 00–24, 25–49, 50–74, and 75–99. Preferably, there is one file per telephone number digit for each five-minute time increment during a processing window. If the CDR is not a duplicate, it is added to the duplicate check file on the DupCheck database 36, 38, 40, 42 based on its telephone number digit and other criteria such as channel seizure date and channel seizure time if the call was made using a mobile telephone. Next, it is added to the Converted Rec database 54, 60 for further processing by Real Time Usage Processors 62, 70.

In the preferred embodiment of the present invention, the last two digits of the billable telephone number are used so that up to 100 data stores and processes may be used for processing the CDRs. Although in the present example, the number of data stores and Usage Processors corresponds, other combinations of data stores and Usage Processors may be used. For example, four Usage Processors may operate in conjunction with 100 data stores such that each Usage Processor selects for processing files that correspond to each of the 100 data stores. In this scenario, each Usage Processor is adapted to select files in a particular range. Alternatively, any one digit of the billable telephone number or three or more digits of the billable telephone number may be used for partitioning CDRs depending on the resulting statistical distribution that is desired. Digits appearing in other fields in the CDRs may be used as well. Although internal holding queues are the preferred type of data store for holding partitioned CDRs, many other types of data stores and file formats may be used.

As shown in FIG. 1, CDRs within a particular digit range may be handled by other processes that operate in conjunction with the processes described so far. For example, a Recycle Extractor process 48, 54 may read from a Recycle database 50, 56 CDRs that previously failed processing by the Usage Processor 28, 30, 32, 34. Recycle Extractor process 48 may handle CDRs in the range 00–49 while Recycle Extractor process 54 handles CDRs in the range 50–99. The CDRs extracted by the Recycle Extractor processes 48, 54 may then be sent to the Real Time Usage Processors 62, 70 for reprocessing. Other processes that contribute to usage processing of CDRs may also be adapted to handle CDRs within a particular digit range. In addition to partitioning CDRs based on digit ranges, groups of partitioned CDRs may be merged into larger groups for additional processing by other processes. For example, as shown in FIG. 1, four Usage Processors 28, 30, 32, 24 manage CDRs in the ranges 00–24, 25–49, 50–74, and 75–99 while two Recycle Extractor processes 48, 54 manage CDRs in the ranges 00–49 and 50–99.

Each Real Time Usage Processor 62, 70 contains the switch processing, guiding, and rating logic. Information from a Subscriber Data Cache 60, 68 is used to complete the usage processing. Each Subscriber Data Cache 60, 68 contains data related to subscriber accounts with telephone numbers corresponding to the range of numbers to be processed by the Real Time Usage Processor. As shown in FIG. 1, one Real Time Usage Processor 62 processes Converted Rec files 46 for telephone numbers with the last two digits in the range of 00–49. Another Real Time Usage Processor 70 processes Converted Rec files 52 for telephone numbers with the last two digits in the range of 50–99. Each Real Time Usage Processor may actually be comprised of multiple Processors depending on processing requirements.

Each Real Time Usage Processor 76, 84 supports one or more independent Subscriber Data Caches 60, 68 that contain subscriber data for processing of CDRs. Each Subscriber Data Cache 60, 68 preferably contains information for a range of telephone number digits, and has its own dedicated Updater 72, 80 which updates records in the cache as necessary based upon business events generated by on-line services. For example, a subscriber may change to a new call plan that affects the charges to be applied to a particular telephone call. Consequently, current information regarding the subscriber's call plan is needed by the Real Time Usage Processor 62, 70 to process the CDRs correctly. Preferably, at the initial startup of the Usage Processors 44, 46, 48, 50, Subscriber Data Caches are generated by a process that reads the subscriber database based on a given telephone number range (e.g., 00–24) and produces a Subscriber Data Cache record for each subscription that has a telephone number in that range. Each Subscriber Data Cache 60, 68 may be assigned a unique ID string that identifies the cache and the telephone number digit range that corresponds to the cache (e.g., subscache0049 for telephone number digits 00–49, subcache50–99 for telephone number digits 50–99).

Preferably, one or more Real Time Usage Processors 62, 70 are run for each Subscriber Data Cache 60, 68. For each Real Time Usage Processor 62, 70 process, the Subscriber Data ID string that identifies a telephone number digit range is entered on the command line. Each Real Time Usage Processor 62, 70 then uses the digit range information to poll the USAGE_TRNSCT Table 18 for records within its digit range that are ready for usage processing and rating. When found, the Converted Rec file for the corresponding digit range is opened and processed one record at a time. For example, Converted Rec file 46 which corresponds to telephone number digit range 00–49 may be used by Real Time Usage Processor 62 while Converted Rec file 52 which corresponds to telephone number digit range 50–99 may be used by Real Time Usage Processor 70. During processing, each call is evaluated against drop criteria, guided to a subscription and a liable account, checked for fraud, evaluated for roaming, and rated. All output from Real Time Usage Processors 62, 70 is placed into a single BLOB (Binary Large Object) file 64, 72 which is passed on to a Consolidator 74.

The Consolidator 74 reads the BLOB files 64, 72 produced by the Real Time Usage Processors 62, 70 and appends billable usage to the Cycle Daily Usage files 76, 78, 80 based on a billing cycle code of a liable account. One or more Consolidators 74 may be run. Preferably, advisory file locking is used to handle contention for the Cycle Daily Usage files 76, 78, 80. A Consolidator 74 may handle input related to any telephone number digits.

The DailyLoad Processor processes 84, 86 load index, statistical, and exception information generated by Real Time Usage Processors 62, 70 and Consolidator 74 into database tables 82. Like Consolidator 74, a DailyLoad Processor process 84, 86 may process usage data for any telephone number digits.

Referring to FIG. 2, a flow chart of the primary steps for a preferred embodiment of the present invention is shown. Partitioning of CDRs may be accomplished as follows. In the first step 110, Call Details Records are collected. The CDRs may be collected directly from one or more switches or indirectly through a usage collection or usage mediation system that collects CDRs from switches and routes them to a usage processing system. Next 112, one or more data stores is created to hold CDRs partitioned in accordance with the present invention. Preferably, each data store has an associated range of digits such that records falling within the range of associated digits may be stored in the data store. For example, holding queues may be populated as the associated digits in each CDRs are examined. In the next steps 114, 116, 118, Call Detail Records are partitioned. In step 114, the record is read. In step 116, digits from the billable telephone number field are read. In a preferred embodiment of the present invention, the last two digits of the telephone number field are read. If two digits are used, records may be split in up to 100 processing streams. Next 118, the record is placed in a holding queue based on the billable telephone number digits for the record. For example, up to 100 holding queues may be created to hold records based on the last two digits of the billable telephone number. In the next step 120, a check is made to determine whether the records in the holding queue should be released for further processing because a particular limitation has been meet. For example, records in a queue may be processed when the queue is full, when a certain age limit for the CDRs is met, etc. If the limitation has not been met (e.g., the queue is not full), another record is read 114 and sent to a holding queue 118 based on the digits of the billable telephone number field 116. If the limitation has been met (e.g., the queue is full), in the next step 122, the records in the data store are processed. For example, the records may be examined to determine if there are any duplicates and to determine whether other criteria for further processing have been met. Next, in step 124, additional information that may be required for further processing is made available. A cache of subscriber data needed for further processing may be created based on the applicable telephone number digit range for the records in the data store. Application of the digit range in creating a subscriber data cache facilitates processing in several ways. First, each process may be provided with access to the subset of information that is needed. In addition, multiple processes are not required to contend for access to the full database. As a result, overall processing time may be reduced. Once the subscriber data cache is available, processing of records may be completed as in step 126.

The present invention results in many advantages. First, any number of real-time collectors can be run on any number of computers. Incoming usage data can be split into different numbers of independent processing streams depending on the number of digits used for processing. For example, if two digits are used, up to 100 independent processing streams may be used. Any number of digits may be used and the digits need not be consecutive. For example, three non-consecutive digits appearing in the middle of the billable telephone number may be used. Although any number and order of digits may be selected, selection of certain digits (e.g., the last two digits) may provide a better statistical distribution. Furthermore, any digits or combination of digits present in the CDR may be used including digits that may be stored in different fields of the CDR.

More importantly, the load in each stream is statistically balanced due to the random nature of calls and telephone number assignments. Another advantage is that many distinct carrier data caches may be supported. For example, if two digits are used, up to 100 independent carrier data caches may be used. Finally, any number of rating processes may be run, each attached to a single carrier data cache. In turn, these processes may be distributed on up to 100 computers. Another advantage is that usage file management and database loading may be operated on a different computer than the Processing and rating functions.

Although the present invention has been described in accordance with a preferred embodiment, it is understood that many modifications to the present invention may be made without departing from the scope of the present invention. For example, other digits or fields present in the Call Detail Record may be used for partitioning of records for further processing. Other digits or fields in the Call Detail Record may provide appropriate statistical distribution of records to facilitate processing. In addition, some of the processes such as the Real Time Usage Processor shown in accordance with the preferred embodiment may actually comprise multiple processes. Alternatively, functionality and features embodiment in different processes may be combined into a single process.

What is claimed is:

1. A system for efficiently processing call detail records, comprising:
   a collection process for collecting call detail records from at least one switch;
   a plurality of data stores, each of said data stores adapted to store call detail records in accordance with a range of digits in said call detail records;
   a partition process for examining each of said call detail records and statistically balancing the distribution of each of said call detail records to one of said plurality of data stores by assigning said call detail records to one of said plurality of data stores in accordance with said range of digits in said call detail records; and
   a plurality of usage processors, each of said usage processors adapted to process call detail records in at least one of said plurality of data stores wherein said range of digits associated with each of said plurality of data stores is also associated with at least one of said plurality of usage processors.

2. The system of claim 1 wherein said digits in said call detail records comprise digits from a billable telephone number or MIN field.

3. The system of claim 2 wherein said digits from said billable telephone number or MIN field comprise the last two digits in said field.

4. The system of claim 1 further comprising a database partition process for partitioning database records in accordance with a plurality of predetermined ranges of digits in said database records.

5. The system of claim 4 wherein said plurality of ranges of digits comprise digits from a billable telephone number or MIN field.

6. The system of claim 1 wherein said data stores comprise internal holding queues.

7. A method for efficiently processing call detail records comprising the steps of:
   (a) collecting a plurality call detail records from a switch;
   (b) creating a plurality of data stores;
   (c) reading digits from a call detail records;
   (d) statistically balancing the distribution of said call detail record to one of said plurality of data stores by assigning said call detail records to one of said plurality of data stores based on said digits from said call detail record;
   (e) determining whether a limit for said data store is met;
   (f) repeating steps (c)–(d) if said limit for said data store is not met; and
   (g) processing said call detail records in said data store if said limit for said data store is met.

8. The method of claim 7 wherein said digits from said call detail records are digits from a billable telephone number field.

9. The method of claim 7 wherein the step of creating said data stores comprises the step of creating internal holding queues.

10. The method of claim 7 wherein the step of determining whether said data store limit is met comprises the step of determining whether said data store is full.

11. A system for efficiently partitioning call detail records comprising:
    a plurality of call detail records, each of said call detail records comprising a plurality of digits; and
    a plurality of usage processors, wherein each of said usage processors is associated with one or more digits in said call detail records according to a desired statistical distribution of said call detail records and each of said usage processors adapted to process said call detail records assigned to it in accordance with one or more digits in said call detail records.

12. The system of claim 11 further comprising a partition process for examining one or more digits in each of said call detail records and assigning each of said call detail records to a usage processor in accordance with said examined digits.

13. The system of claim 11 wherein said digits are from a billable telephone number or MIN in said call detail record.

14. The system of claim 11 further comprising a database partition process for partitioning database records in accordance with said one or more predetermined digits in said call detail records used to assign said call detail records to said usage processors.

* * * * *